Sept. 21, 1965   C. W. RANSON   3,207,482
FRUIT AND VEGETABLE WASHING DEVICE WITH VERTICAL
CIRCULATIVE FLOW AND RIBBED COVER
Filed Jan. 7, 1963

United States Patent Office 3,207,482
Patented Sept. 21, 1965

3,207,482
FRUIT AND VEGETABLE WASHING DEVICE WITH VERTICAL CIRCULATIVE FLOW AND RIBBED COVER
Charles W. Ranson, 7906 Agnew Ave., Los Angeles 45, Calif.
Filed Jan. 7, 1963, Ser. No. 249,894
11 Claims. (Cl. 259—4)

The present invention relates to a washing device for fruits, vegetables, and other solid food units. The device provides for imparting to contained liquid a two dimensional circulative flow in a vertical plane. Provision is included for the circulative liquid flow to receive sufficient kinetic energy from tangential inlet liquid flow to effect continuous vertical circulative motion of the fruits or vegetables.

Objects of the invention are to provide for the thorough cleaning of all surface areas of fruits and vegetables in minimum time and without bruises or damage.

Other objects are to provide a simple cleaning device having no moving mechanical parts, and which can be used conveniently in household kitchen sinks, and which can utilize kinetic energy available from conventional household faucet water.

Another object is to provide additional cleaning by gentle washboard type scrubbing.

Another object is to prevent the loss overboard of circulating food units during copious overflow of exhaust liquid.

Another object is to provide an ample number of small exhaust ports to block the egress of small berries and to establish low liquid escape velocities at the exhaust port inlets such that the liquid pressure at the exhaust port inlets is insufficient to grip the berries to the ports and block liquid escape.

Another object is to provide a solid lid surface from a top view for an improved appearance.

Another object is to provide a picturesque operating appearance wherein thin sheets of exhaust liquid are extruded laterally and curve outwardly and downwardly in a pleasing geometric waterfall.

Another object is to minimize back pressure from the overflow ports to provide maximum liquid flow efficiency.

Another object is to provide a high rate of dilution of impurities by a high exhaust overflow rate.

A number of other objects and advantages will become apparent as the description proceeds.

One form of the present invention is illustrated in the accompanying drawings wherein similar numerals refer to similar parts throughout the views.

FIGURE 1 is a side view of the fruit and vegetable washing device properly positioned beneath an open water faucet. The arrows indicate the flow path of the circulative liquid flow. The broken section of FIGURE 1 is a view along line 4—4 of FIGURE 2.

Figure 2:
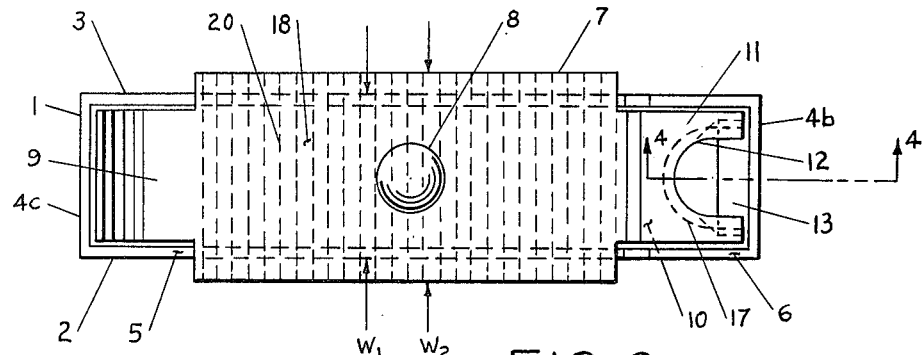
FIGURE 2 is a plan view of FIGURE 1 showing the comparatively narrow width of the washing device.
Figure 3:
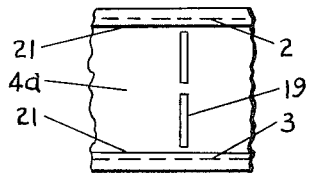
FIGURE 3 is a fragmentary view along line 3—3 of FIGURE 1 showing auxiliary exhaust ports in the bottom wall of the device.

The washing of fruits and vegetables in the kitchen has heretofore been accomplished by the use of a colander, a conventional kitchen pan, or by hand rubbing under an open faucet.

The colander is a bowl shaped sieve with a base. For food washing purposes, the colander is held under an open faucet while containing a pile of food units. The bulk of the water follows the path of least resistance and flows around rather than through the pile of food units. The velocity of the water seeping between the food units is low due to resistance so that liquid scouring and dissolving action is relatively inefficient and slow. Also the food units lie static so that areas of mutual contact and areas of contact with the container receive no washing.

The conventional kitchen pan is generally used for washing by filling the bottom of the pan with food units and most of the remainder with water. The pan is then shaken by hand to simulate the action of a tumbling barrel. The cleaning action is highly erratic and inconsistent. Rinsing is only partial as the liquid is poured out. Bruses and surface damage can be done to berries and delicate skin fruits by the shifting weight of the total load.

The prior art has also provided a washing device of the type described herein. This device is described in my copending application of Serial Number 246,715, filed Dec. 24, 1962. Said prior device provides distinct improvement and advantages. The present device provides further improvements and advantages.

The present invention improves upon the prior devices and provides advantages as set forth by the above statements of objectives.

Referring to the several figures, washing device 1 is comprised of side walls 2 and 3 extending longitudinally and vertically and spaced apart in relative proximity. A lateral wall 4 extends between side walls 2 and 3 to provide a bottom wall 4a and two opposite end walls 4b and 4c. The bottom wall 4a and end wall 4b are faired together by radius $R_1$ to provide a curved inner surface, as shown.

The inner surface of end wall 4b extends vertically above point A, which is the point of tangency with radius $R_1$. Point B indicates the lower point of tangency with radius $R_1$. Bottom wall 4a and end wall 4c are faired together by radius $R_2$. The internal surface of lateral wall 4 provides a smooth, curved perimeter flow path for contained liquid.

The washing device has a large upper perimeter 5 and includes a spout portion 6. This provides an open top container construction. The open top is covered by closure unit or lid 7. Lid 7 includes a lifting knob 8 and guide vane portions 9 and 10 at opposite ends. Curature or slant of guide vane portion 9 is indicated by radius $R_3$ and that of guide vane portion 10 by radius $R_4$. These guide vane portions provide for optimum liquid flow patterns with reduced kinetic energy losses and eliminate the jamming tendency of food units at turns.

Lid 7 includes a liquid inlet unit or portion 11 which is partially integral with guide vane portion 10. Inlet portion 11 includes an upper admission port portion 12, a normally submerged exit port portion 13, and an interconnecting vertical duct portion 14. The duct portions are adjacent to end wall 4b so that the end wall cooperates to provide a portion of the ducting wall.

Figure 1:
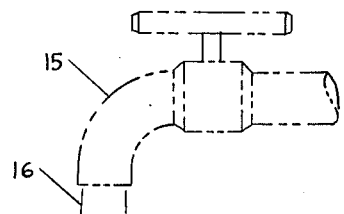
Figure 1:
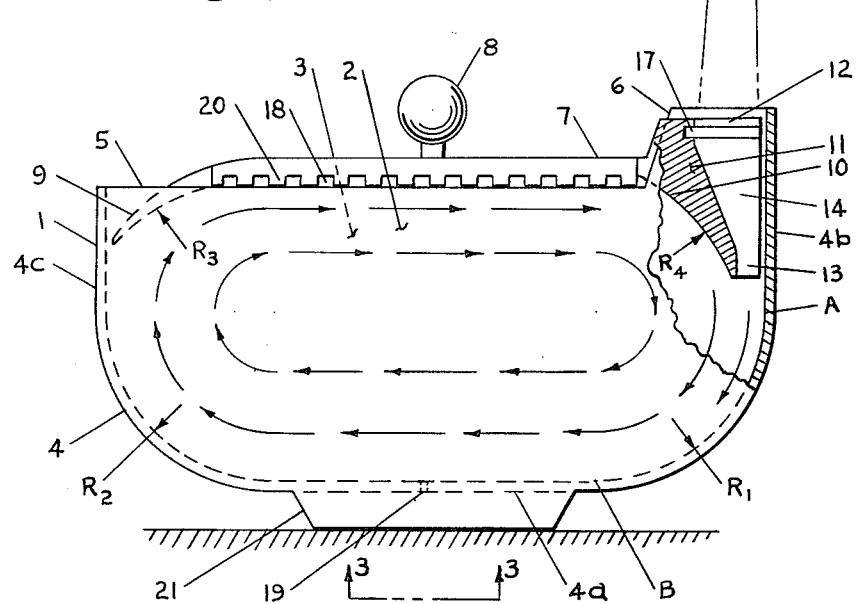

For operation, the device is partially filled with fruits or vegetables or other food units and placed under an open faucet 15. Device 1 is positioned so the water jet enters admission port portion 12. The water preferably enters as a free jet 16, as shown in FIGURE 1. As an option, not shown, an elastic extension conduit may be inserted in admission port portion 12 to be gripped by annular groove 17 of inlet portion 11. The other end of the conduit may be adapted to fit snugly over the outside diameter of the nozzle of faucet 15. This optional installation is desirable where water pressure is low but has the disadvantage of being less convenient and more costly.

Water jet 16 passes through inlet portion 11 and is ejected at exit port portion 13 entering the container of the washing device. The water jet enters adjacent to end wall 4b, passes tangent point A and is guided by the surface at $R_1$ into a circulative path. The liquid is further directed into a circulative path by the curved surface at radius $R_2$ and the slanted or curved surfaces at radii $R_3$ and $R_4$ of lid 7. The established flow path is in accordance with the arrows shown in FIGURE 1. The liquid major exhaust occurs along the many small transverse grooves or channels 18 in the bottom of lid 7. Auxiliary exhaust ports 19 in bottom lateral wall 4a provide for the continuous exhausting of small liquid jets to eject non-soluble sand and grit.

Washing device 1 contains liquid vertically within a width $W_1$ of relatively narrow proportions as shown in FIGURE 2. This lateral confinement provides for two dimensional liquid flow in a vertical plane. The circulative flow pattern is induced by the tangential inlet jet and the curved inner surfaces of the lateral wall, FIGURE 1. Two dimensional confinement contributes greatly to liquid flow control and reduces dissipation of kinetic energy from lateral flow and turbulence.

As stated above, the side walls 2 and 3 are in the state of being mutually near. This side wall proximity endows the washing device with a width less than the length or height or each. The device has been found to be operable using conventional household faucets and a reasonable container volume when width $W_1$ is about one half or less of the length or height of the device. As the width of the device is decreased with respect to the length or height, the efficiency and load capacity increase. When the width of the device is relatively large with respect to the length or height the circulative two dimensional flow pattern is not obtained, but localized random liquid agitation occurs at the region of faucet water entry. This results in erratic and negligible washing action. The specific side wall proximity required for satisfactory performance of any given installation depends upon a number of variables including the liquid mass flow rate, the height and length of the device, the internal contours of the device, the densities and dimensions of the food units to be cleaned, and the size of the wash load.

The kinetic energy of the inlet jet is conserved by the relatively large proportions of radii $R_1$, $R_2$, $R_3$ and $R_4$, and by the substantially two dimensional liquid flow pattern. The overflow liquid is of low velocity and low kinetic energy loss. Viscosity functions to maintain the entire liuqid body in a state of circulative flow.

The two dimensional circulative liquid flow in a vertical plane imparts similar circulative motion to contained food units. The submerged food units are buoyed by forces equal to the weights of the displaced liquid. Consequently, only a relatively small amount of liquid drag force is required to lift a given food unit vertically against the gravity force. The drag force of a solid body in non-laminar liquid flow is proportional to the relative velocity squared. Hence, by constructing washing device 1 as described to conserve kinetic energy and to maintain high liquid rotative velocity, the food units are forced to rise and circulate with the liquid. Food unit circulative washing has been achieved using the water jet from conventional houshold faucets. It was found that the food units experience local tumbling as they move in general circulative flow. This tumbling action adds to the liquid scouring effect and to the cleaning by mutual attrition between food units.

During operation of the washing device, insecticides and other chemicals and soil particles are progesssively removed from food units by a continuously diluting liquid flow. The impurities are carried away in the bulk liquid overflow along the numerous small transverse groove 18 in lid 7. The numerous grooves or channels provide a relatively large total overflow port inlet area with a small liquid overflow rate per unit area. This low overflow rate corresponds to a small liquid pressure at the groove inlet areas. This small pressure has been found in tests to be insufficient to grip small, light weight berries to ribs 20 between grooves 18. Consequently the overflow grooves do not become clogged with food units and the device continues to operate normally. The device does not clog or stall. Small berries are not swept overboard by the exhaust liquid because of the obstruction by lid 7 which contains ribs 20 spaced smaller than the size of the food units being washed. It is significant that when grooves 18 and ribs 20 are eliminated and replaced by a simple clearance slot between lid 7 and upper perimeter 5 that the slot quickly becomes jammed when cleaning small berries and the device stalls. The present lid configuration overcomes this deficiency. However, a simple clearance slot is satisfactory for limited application to certain larger food units.

The exhausting liquid has a tendency to pull food units along the edges of transverse ribs 20 as the food units continue the circulative motion. Thus lid 7 functions as a washboard and provides gentle abrasion cleaning of the food units.

Closure unit or lid 7 has a width $W_2$ greater than the width $W_1$ of device 1 as shown in FIGURE 2. As the exhaust liquid is ejected laterally out grooves 18, the liquid has been found in tests to adhere to the surfaces of the overhanging grooves. This is due to the capillary action of the liquid in contact with the solid material of the lid, and to the resistance of the ejecting liquid to separating from the grooves and creating local vacuums. The exhausting liquid ejects clear of side walls 2 and 3 and cascades outwardly and downwardly in picturesque thin liquid sheets. The visual effect is pleasing and adds to the sales appeal of the device. When the width $W_2$ of lid 7 is the same as or less than the width $W_1$ of the container portion, the overflow cascade effect is lost and the overflow liquid merely runs down the side of the container.

Heavier non soluble impurities are discharged through auxiliary exhaust ports 19 as the impurities are swept by the liquid along the surface of bottom wall 4a. Ports 19 by the removal of the boundary layer retard the formation of major turbulence, and therefore improve efficiency by conserving kinetic energy of the main liquid flow. When faucet 15 is closed, drainage occurs automatically through ports 19 permitting food units conviently to be poured from spout 6 without liquid.

Upper admission port portion 12 extends upwardly to provide an anti-splash chamber. The inlet port and annular grooves 17 function to trap splashing water. Admission port portion 12 is shaped to receive a circular water jet or conduit. Exit port portion 13 is of elongated cross sections to provide improved performance as has been demonstrated by tests and as described in copending application of Serial Number 241,619, filed December 3, 1962. Duct portion 14 provides a gradual transition in cross sectional shapes from partially circular to elongated.

Inlet unit or portion 11 may be separable from lid 7 or the inlet portion may be bonded or otherwise integrally associated with the lid or the washing device container portion within the scope of the invention. Similarly, the inlet unit or portion may be separable into sections which combine in use to perform as described.

The washing device rests on parallel skids 21 to provide elevation clearance for liquid jets from auxiliary exhaust ports 19.

While one imbodiment of the present invention has been illustrated it is to be understood that what is defined by Letters Patent is specified by the appended claims.

What is claimed is:

1. A washing device including two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said walls terminating upwardly to provide an upper opening, and a cover member adapted for said opening, and a plurality of channels in said cover member from the inner surface thereof, and with said cover member in 2. A washing device and cover member as in claim 1, and the inner surface of at least one end of said cover member slanted downwardly to normally guide contained liquid in a curved path.

3. A washing device and cover member as in claim 1, and the inner surfaces of two opposite ends of said cover member slanted downwardly to normally guide contained liquid in a curved path.

4. A washing device including two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said walls terminating upwardly to provide an upper opening, and a cover member adapted for said opening, and a plurality of channels in said cover member from the inner surfaces thereof, and with said cover member in normal installed position said channels traversing container wall edges, and at least one end of said cover member providing a liquid inlet portion, said inlet portion including an upper admission port portion and a lower normally submerged exit port portion and an interconnecting duct portion.

5. A washing device and cover member as in claim 1, and said cover member extending outwardly beyond at least one of said side walls for at least a portion of the length thereof to provide a waterfall effect by overflow liquid during operation.

6. A washing device including two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said walls terminating upwardly to provide an upper opening, and a cover member adapted for said opening, and said cover member provided with a plurality of channels in the lower surface thereof, and said channels normally traversing container wall upper edges.

7. A washing device including two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said walls terminating upwardly to provide an upper opening, and a cover member adapted for said opening, and said cover member provided with a plurality of ribs on the lower surface thereof, and said ribs normally traversing container wall upper edges.

8. A washing device and cover member as in claim 4, and said exit port portion of the inlet portion at the final discharge section having an elongated transverse cross section.

9. A washing device and cover member as in claim 4, and said upper port portion open upwardly to the atmosphere.

10. A washing device including two side walls extending longitudinally and vertically and spaced apart, a lateral wall extending between said side walls to provide a bottom wall and two opposite end walls and connecting with said side walls in unitary relation, and the inner surface of said bottom wall and the inner surface of at least one of said end walls substantially faired to provide a substantially curved inner surface at the region of juncture, and said walls terminating upwardly to provide an upper opening, and a cover member adapted for said opening, and the center portion of said cover member sufficiently wide to seat on said side walls, and at least one end portion of said cover member relatively narrow to not seat on said side walls, and a plurality of channels in said cover member from the inner surface thereof, and with said cover member in normal installed position said channels traversing container wall edges.

11. A washing device and cover member as in claim 1, and said cover member substantially rectangular or elongated in planform and sufficiently wide at center regions to be supported on said side walls and relatively narrow in planform at opposite ends, and said opposite ends slanted downwardly to provide liquid turning vanes during normal operation, and a liquid inlet portion associated with one of said relatively narrow end portions, said inlet portion including an upper admission port portion and a lower normally submerged exit port portion and an interconnecting duct portion.

References Cited by the Examiner

UNITED STATES PATENTS

| | | | |
|---|---|---|---|
| 577,362 | 2/97 | Ettlinger | 239—592 X |
| 782,648 | 2/05 | Gaenssler | 251—118 X |
| 1,122,307 | 12/14 | Rhodes | 220—86 |
| 1,245,768 | 11/17 | Randall | 259—36 |
| 1,248,472 | 12/17 | Fransmann | 220—86 |
| 1,250,518 | 12/17 | Schlesinger. | |
| 1,382,992 | 6/21 | Lombard | 68—184 |
| 1,663,382 | 3/28 | Merkel | 251—118 X |
| 1,775,554 | 9/30 | Dehle | 68—184 |
| 1,807,677 | 6/31 | Torson | 134—186 |
| 2,212,559 | 8/40 | Ehret | 134—186 |
| 2,254,003 | 8/41 | De Marco | 68—196 |
| 2,732,700 | 1/56 | Dunn | 68—233 X |
| 2,960,991 | 11/60 | Bland | 134—193 X |

FOREIGN PATENTS

| | | |
|---|---|---|
| 546,571 | 7/56 | Italy. |
| 587,859 | 1/59 | Italy. |

CHARLES A. WILLMUTH, *Primary Examiner.*

GEORGE J. NORTH, *Examiner.*